UNITED STATES PATENT OFFICE.

WILLIAM MARSH, OF MANCHESTER, ENGLAND.

METHOD OF MAKING CARBONATE OF MAGNESIA.

SPECIFICATION forming part of Letters Patent No. 686,947, dated November 19, 1901.

Application filed July 9, 1901. Serial No. 67,634. (No specimens.)

*To all whom it may concern:*

Be it known that I, WILLIAM MARSH, chemical manufacturer, a subject of the King of Great Britain and Ireland, of Soho Works, Ancoats, Manchester, in the county of Lancaster, England, have invented certain new and useful Improvements in the Manufacture of Carbonate of Magnesia, (for which I have made application in Great Britain, No. 17,888, and dated October 9, 1900,) of which the following is a specification.

This invention has reference to the manufacture of what is known and sold as "light carbonate of magnesia" ($MgCO_3$) by what is called the "Paterson" process. In this process an aqueous emulsion of dolomite or magnesia is submitted under pressure to the action of carbonic acid, ($CO_2$,) resulting, however, in a yield of no more than two per cent. of the salt in the liquor, or thereabout.

As a result of repeated experiments, I have found that the addition to the aqueous solution of magnesia of certain ingredients will cause the mixture or solution to absorb and retain carbonic acid and maintain it in an open condition, preventing it from compacting in a mass, thus affording the oxid of magnesia or other substance a greater surface for chemical action. Various substances possessing the above properties may be used; but after repeated trials I find the most useful to be powdered charcoal, either animal or vegetable. Paraffin or other similar petroleum-oil may also be used with good result.

In carrying my invention into effect I employ dolomite or magnesite, or a mixture of the two, burned to an oxid or burnt magnesite and oxid of lime, and to a mixture of these bodies with water, as in the Paterson process, I add a proportion—say about ten per cent. or more—of powdered animal or vegetable charcoal. The solution is then submitted to carbonic acid under a pressure of about one hundred and sixty pounds to the square inch with agitation. The usual process of manufacture is adhered to, and when employing magnesite a small proportion of burnt dolomite or lime may be added to the liquid. The charcoal or other medium used may be recovered by filtration for use over again. By these means I am enabled to obtain a yield of five per cent. and upward of carbonite of magnesia.

By the addition of a body capable of absorbing and retaining carbonic acid and at the same time affording increased contact-surface, as described, a substantial reduction in the cost of manufacture as regards plant, time, and fuel for a given output results.

I declare that what I claim is—

1. The herein-described process of producing carbonate of magnesia consisting in adding water to a magnesia compound, adding to said mixture a substance capable of causing the mixture to retain carbonic acid, and finally subjecting the resulting mixture to the action of carbonic acid under pressure, substantially as described.

2. The herein-described process of producing carbonate of magnesia consisting in burning magnesia to produce an oxid, adding water thereto, adding powdered charcoal to said magnesium oxid and water, and subjecting the resulting mixture to the action of carbonic acid under pressure, substantially as described.

In witness whereof I have hereunto set my hand in presence of two witnesses.

WILLIAM MARSH.

Witnesses:
 JOSHUA ENTWISLE,
 ALFRED YATES.